United States Patent
McNamara et al.

(10) Patent No.: US 8,793,161 B2
(45) Date of Patent: Jul. 29, 2014

(54) METHODS AND APPARATUS FOR VISUALLY ASSISTED FAST FOOD ORDER PREPARATION

(75) Inventors: Michael Robertson McNamara, Dundee (GB); Thomas Grant Kidd, Dundee (GB)

(73) Assignee: NCR Corporation, Duluth, GA (US)

( * ) Notice: Subject to any disclaimer, the term of this patent is extended or adjusted under 35 U.S.C. 154(b) by 1070 days.

(21) Appl. No.: 12/564,411

(22) Filed: Sep. 22, 2009

(65) Prior Publication Data

US 2011/0071912 A1    Mar. 24, 2011

(51) Int. Cl.
G06Q 40/00 (2012.01)
G06Q 10/06 (2012.01)
G06Q 50/12 (2012.01)

(52) U.S. Cl.
CPC ............... *G06Q 50/12* (2013.01); *G06Q 10/06* (2013.01)

USPC .......................................................... 705/15

(58) Field of Classification Search
USPC .......................................................... 705/2
See application file for complete search history.

(56) References Cited

U.S. PATENT DOCUMENTS

2008/0306761 A1* 12/2008 George et al. ..................... 705/2
2008/0312957 A1* 12/2008 Luciano et al. .................. 705/2

* cited by examiner

*Primary Examiner* — Shay S Glass
(74) *Attorney, Agent, or Firm* — Peter H. Priest

(57) ABSTRACT

Systems and techniques for providing feedback to improve accuracy of order assembly. Images corresponding to items comprising an order transaction are presented in a display. As items are moved to an order assembly area, each item is detected and an image corresponding to the item is removed from the display. If an incorrect item is detected, an error message identifying the incorrect item is displayed. Once all items comprising the order have been detected, a completion message is displayed.

21 Claims, 7 Drawing Sheets

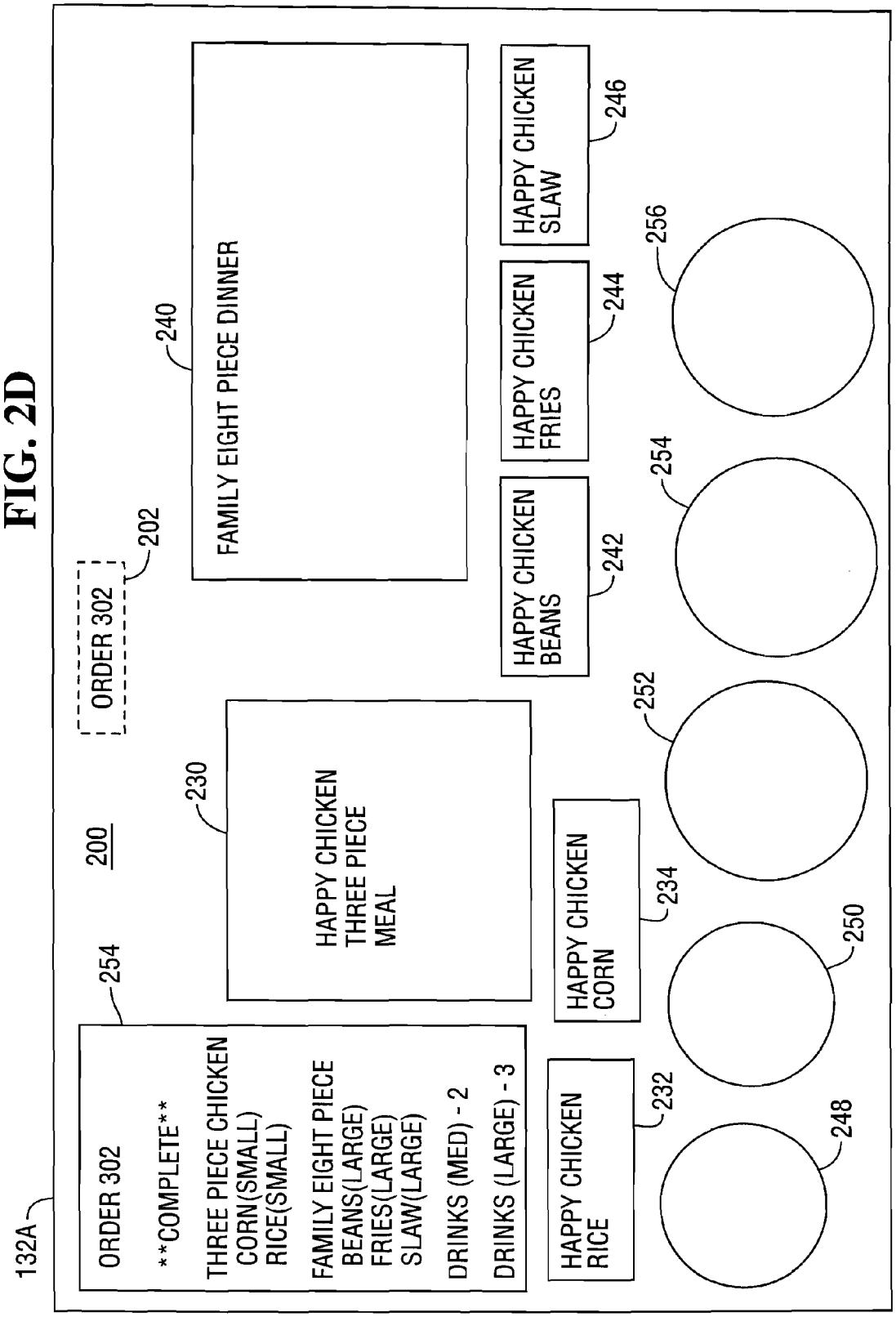

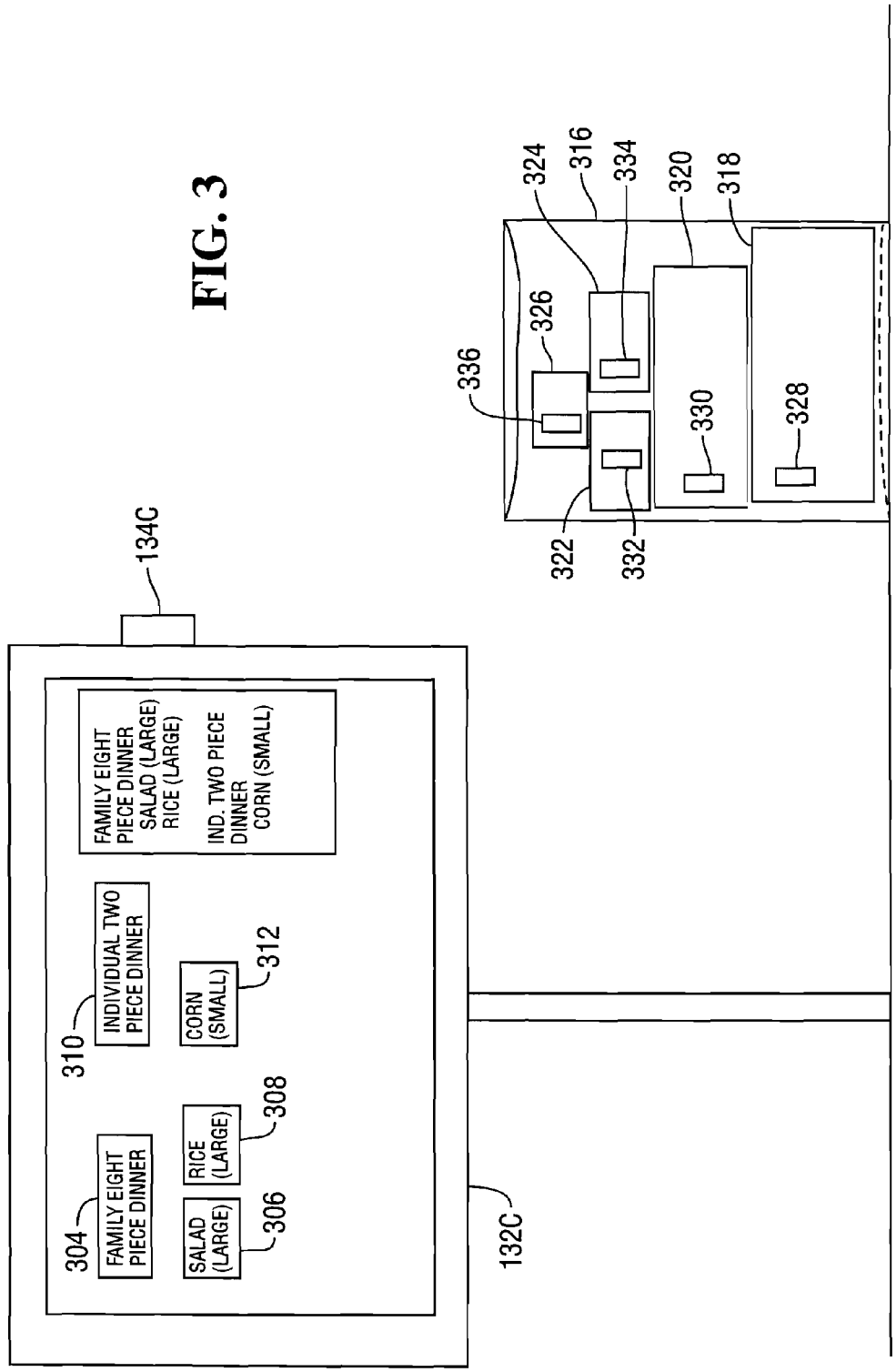

METHODS AND APPARATUS FOR VISUALLY ASSISTED FAST FOOD ORDER PREPARATION

FIELD OF THE INVENTION

The present invention relates generally to improved systems and techniques for fast food order preparation. More particularly, the invention relates to improved systems and techniques for providing visual feedback by presenting images of items to be assembled in fulfillment of an order and removing each image as a corresponding item is detected.

BACKGROUND OF THE INVENTION

Fast, accurate, and efficient fulfillment of orders continues to be an important aspect of the fast food industry. Continued advances in technology have led to greater and greater automation of the delivery of orders to employees responsible for their fulfillment. Automation has allowed for an employee taking the order to enter order details which are then automatically delivered to employees filling the order. Advancing capabilities for information delivery provide for greater and greater ability to provide information to persons filling an order and also provide increased ability for automated detection.

SUMMARY OF THE INVENTION

The present invention recognizes that increasing information delivery and detection capability furnishes mechanisms for presenting visual displays of items that are to be provided and for providing feedback when correct items are placed. Therefore, a system according to an aspect of the present invention comprises an order assembly area having display capabilities as well as detection capabilities. When an order is placed, an image of each ordered item is displayed on the order assembly area. As each item making up the order is placed on the order assembly area, the image corresponding to the item is removed. Items may be detected, for example, through reading a one or two dimensional bar code on an item container or wrapper, a code integrated into a design, a radio frequency identification (RFID) tag, infrared tag, or any other desired mechanism for identifying an item. If an incorrect item is placed, a notification may be presented, such as an error notice on the display, an audible tone, or both. When a correct item is placed, the displayed image of the order disappears, and when all items have been placed, a notification is issued that the order has been completed.

BRIEF DESCRIPTION OF THE DRAWINGS

FIGS. 2A-2D illustrate a display screen at various stages of order preparation according to an aspect of the present invention;

FIG. 3 illustrates an alternative display screen according to an aspect of the present invention.

DETAILED DESCRIPTION

Figure 1:
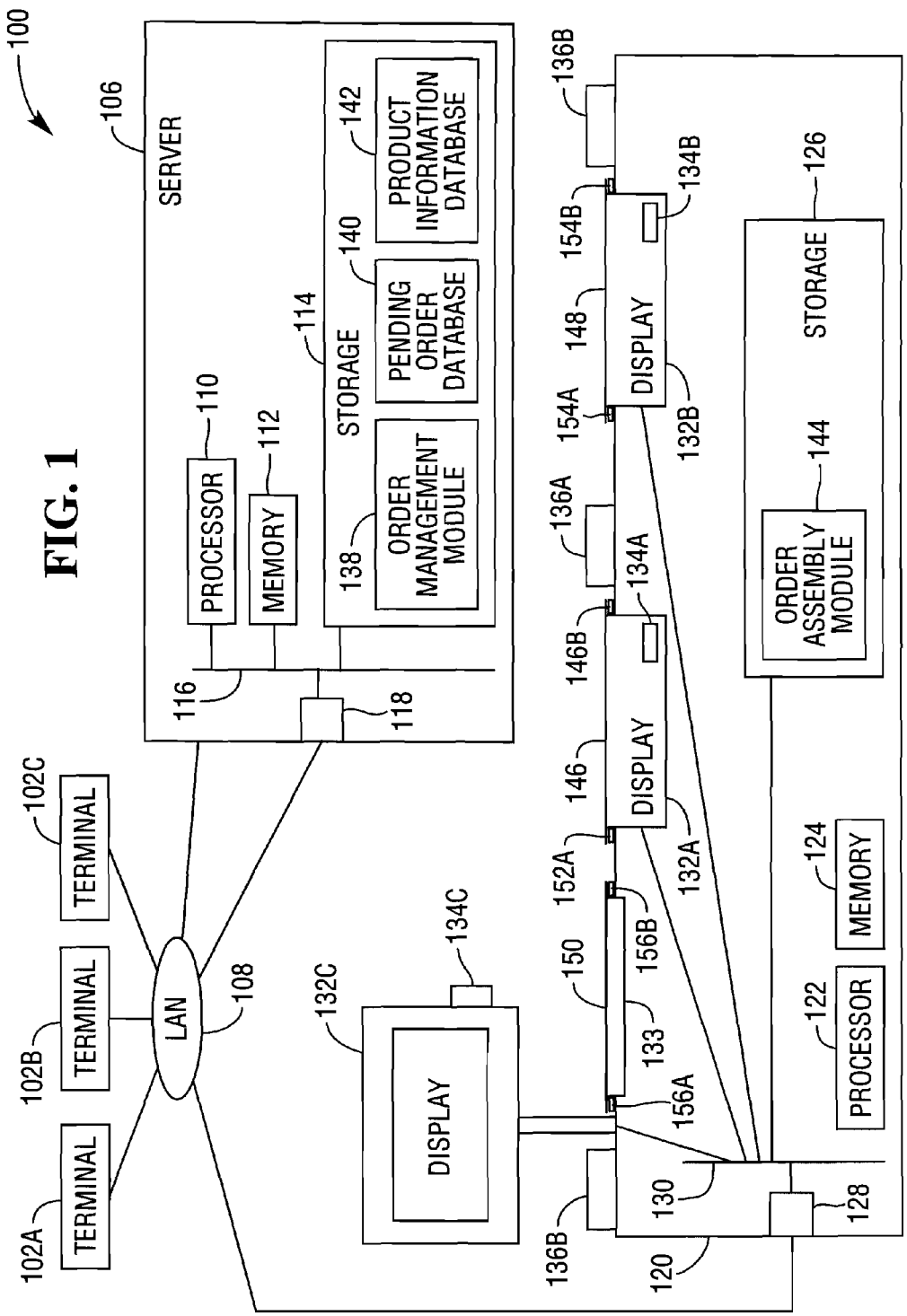
FIG. 1 illustrates a fast food ordering system according to an aspect of the present invention.

FIG. 1 illustrates a fast food ordering system 100 according to an aspect of the present invention. The system 100 includes a plurality of transaction terminals 102A-102C, which may include employee operated and self service terminals in any combination desired. The terminals 102E communicate with a central server 106 through a local area network 108. The server 106 suitably includes a processor 110, memory 112, and storage 114, communicating over a bus 116. The server 106 also includes a network interface 118, allowing communication with the terminals 102A-102E and with an order assembly station 120. The order assembly station includes its own processor 122, memory 124, storage 126, network interface 128, and bus 130, as well as a plurality of order assembly display screens 132A-132C. Order assembly display screens 132A and 132B are horizontal, allowing items to be assembled directly on the display screens 132A and 132B, and order assembly display 132C is a vertical display, providing information relating to items assembled at the associated assembly area 133. The order assembly display screens 132A and 132B may suitably be implemented as interactive display screens capable of both displaying images and recognizing inputs. In addition, the order assembly display screens 132A and 132B may have associated sensing elements 134A and 134B, providing the capability to recognize symbols such as radio frequency identification (RFID) signals, infrared signals, and the like. The order assembly display 132C and the order assembly area 133 have an associated sensing element 134C. The order assembly displays 132A and 132B, and the order assembly display 132C and order assembly area 133 have associated printers 136A-136C, respectively. The order assembly display screens 132A and 132B may suitably provide display capabilities and touch recognition capabilities, including multi touch capabilities. The order assembly display screens 132A and 132B may also suitably provide image and object recognition capabilities, allowing recognition of codes and objects placed on the surfaces. For example, the display screens 132A and 132B may provide recognition and decoding capabilities for encoded information, such as one dimensional and two dimensional bar codes, or graphic designs incorporating encoded digital information, such as MICROSOFT Tags. The display screens 132A and 132B may also be suitably designed so as to provide object recognition capabilities for objects as well as objects placed on or near the screen.

One suitable mechanism for implementing display screens such as the screens 132A and 132B is as a MICROSOFT SURFACE, which interprets touches, images, and objects, and provides the interpretations to appropriate software components.

The server 106 stores an order management module 138, suitably implemented as software stored in the storage 114 and transferred to memory 112 as needed for execution by the processor 110. The order management module 138 manages information received from the transaction terminals 102A-102E, constructs pending order records, and communicates with the order assembly station 120. The server 106 stores the pending order records in a pending order database 140, residing in the storage 114. The server 106 also stores a product information database 142, which includes a plurality of product records, with one record for each product available for purchase. A product record for a product includes price, description, and image information for a product, and also includes identifier information associated with the product. The identifier information may appear on product containers or wrappers, and is used by the order management module 138 to identify items that have been assembled in fulfillment of an order.

When an order is placed, the order management module 138 prepares a pending order record for the order, including financial information relating to the order and information relating to items in the order. The order management module 138 stores the pending order record in the pending order database 140, and also transmits the pending order record to the order assembly station 120. The order assembly station 120 invokes an order assembly module 144, which selects one of the order assembly display screens 132A-132C for assembly of the order. For example, the order assembly module 144 may queue pending order records and select an order assembly display for each order record as orders are fulfilled and an order assembly display becomes available for assembly of a new order. To take another example, different ones of the display screens may be configured differently, as the display screen 132C is configured differently from the display screens 132A and 132B, and orders that are more appropriate for one of the display screens are routed to that display screen.

When the order assembly module 144 has selected a display for assembly of the order, the order assembly module 144 retrieves image information for each item in the order from the product information database 143 and prepares a display including an image of each item in the order record, presented, for example, on the display screen 132A. The display may also include a listing of item descriptions and other relevant information, presented in text form in an appropriate area of the display screen 132A. An employee collects items making up the order and places each item on the display screen 132A. As each item is placed on the display screen 132A, the sensing element 134A detects the identity of the item. Depending on the desired operation of the system 100, items may be placed directly on the display screen 132A, or clear trays may be used. The use of clear trays allows an employee to see the displayed items as the order is being assembled, and remove the order as a whole when the order is complete, rather than removing each item individually. In some cases, however, such as when an order is being prepared for takeout, trays may not be needed. Instead, to take one example, a takeout bag may be placed on the display and the various items making up the order may be placed in the bag. As each item is placed in the bag, a corresponding image is removed from the display.

As items are placed on display screens or in order assembly areas in fulfillment of an order, the sensing elements 134A-134C detect encoded information identifying the items being placed and furnish the encoded information to the order assembly module 144. The order assembly module 144 uses the encoded information to identify items in the pending order record for each order being assembled. First, the order assembly module 144 determines if the detected item appears on the order record for the order associated with the display screen. If the item does not appear in the order record, the order assembly module 144 prepares an error message for indication, suitably examining the product information database 142 to identify the incorrect item. If the item does appear in the order record, the order assembly module 144 controls the display screen to remove the display image corresponding to the order. Once all items indicated by an order record have been placed, the order assembly module 144 controls the display to present an order completion message and may also direct the sounding of an audible message and the printing of an order record.

The sensing elements 134A-134C are preferably configured so that it is not necessary to place an item directly on the display image corresponding to the item. Instead, whenever an item is sensed, the corresponding image is removed. If one or more of the remaining images is not visible, the images are rearranged so that all images are visible. Such rearrangement may be accomplished, for example, by using the sensing element 134A to identify areas of the display screen 132A where visibility is blocked. The order assembly module 144 arranges the order display presented on the display screen 132A so that all displayed items are in visible areas of the display screen 132A.

One particular advantage of a vertical display screen such as the screen 132C is its use in situations where space is at a premium, for example, at a drive through window. At a drive through window, orders are typically assembled into bags, which typically have smaller footprints than trays, or collections of items laid out on a surface. Detection under such circumstances may be accomplished, for example, by implementing a detector such as the detector 134C as an infrared reader or a radio frequency identification reader configured to detect items in a bagging area. Items placed in the bagging area will be automatically detected, and the removal of images from the display will provide feedback to an employee preparing an order, even if the employee does not place each item directly on its corresponding image.

If desired, stations such as the station 120 may also be configured so as to provide weight verification. Panels such as the panels 146, 148, and 150, may be disposed on top of the displays 132A and 132B and the order assembly area 133. The panel 146 is supported by weight sensors 152A and 152B, the panel 148 is supported by weight sensors 154A and 154B, and the panel 150 is supported by weight sensors 156A and 156B. The sensors may suitably be strain gauges, and the panels may suitably be transparent, particularly the panels 146 and 148, which are disposed above displays. As each object placed on one of the panels is identified, the order assembly module 144 compares an expected weight for the identified item to the actual weight increment detected. If a mismatch is detected, an error message is presented.

Figure 2A:
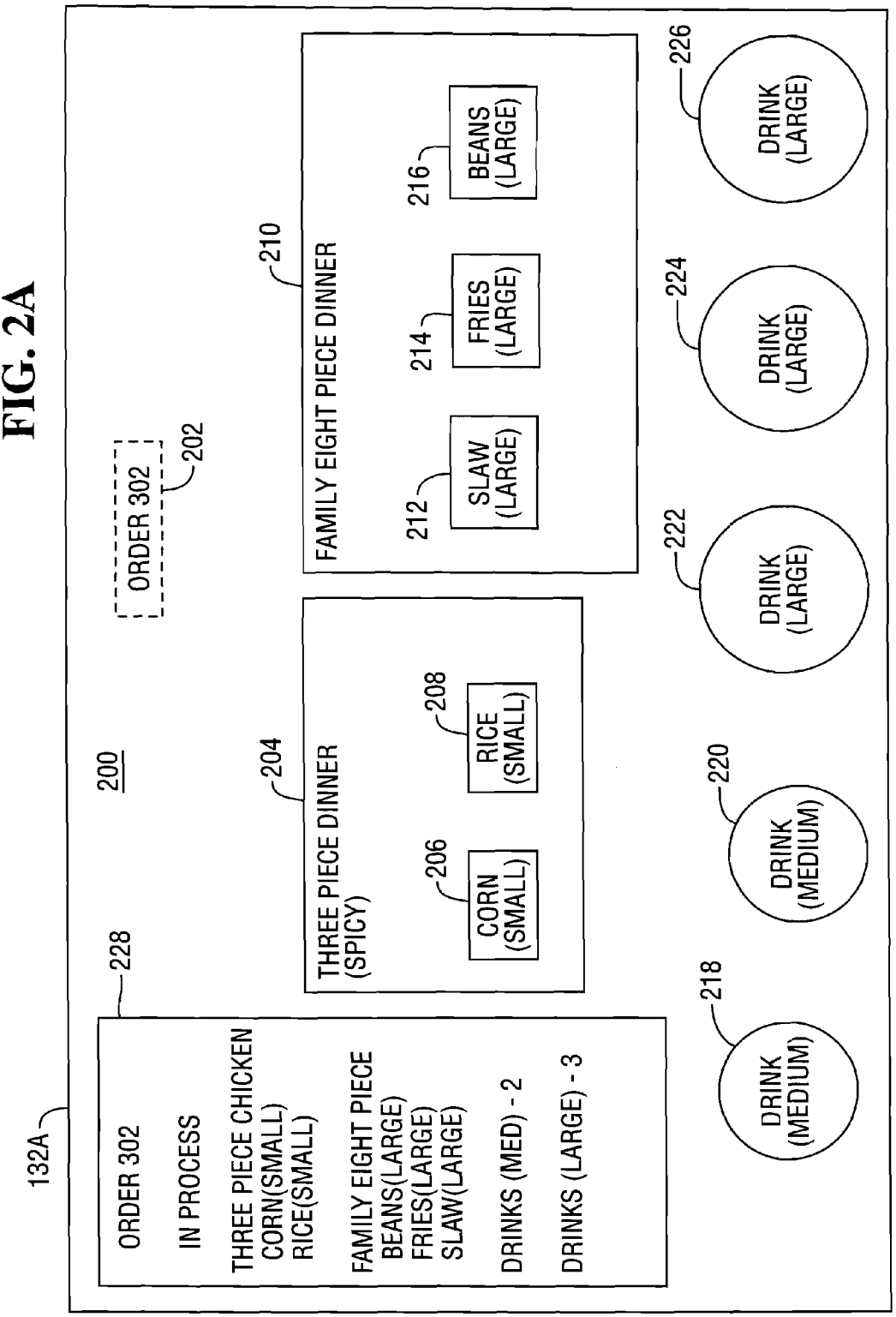

FIG. 2A illustrates additional details of the display screen 132A. The display screen 132B is not illustrated here in order to avoid duplication, but it will be recognized that the display screens 132B may operate in a similar manner to that of the display screen 132A. As noted above, the display screen 132C is configured vertically, with items being assembled in the assembly area 133 separate from the display screen 132C, so that the display screen 132C displays information relating to orders and items placed in the assembly area 133 as discussed in greater detail below.

The display screen 132A is illustrated here as presenting a display 200, including information relating to the order to be filled. The information may suitably include an order identifier 202 and various icons indicating the components making up the order. Here, the components include a spicy three piece chicken dinner with small sides of corn and rice, a family 8 piece dinner with large sides of slaw, fries, and beans, two medium drinks, and three large drinks. The display 200 thus presents images of icons 204-226 indicating the various items. As the different order components are assembled, they are placed on the display screen 132A and icons corresponding to the items that have been placed are removed. The display 200 also presents an order listing 228, listing the items in text format, with the listing for each item being removed as the item is added.

Figure 2B:
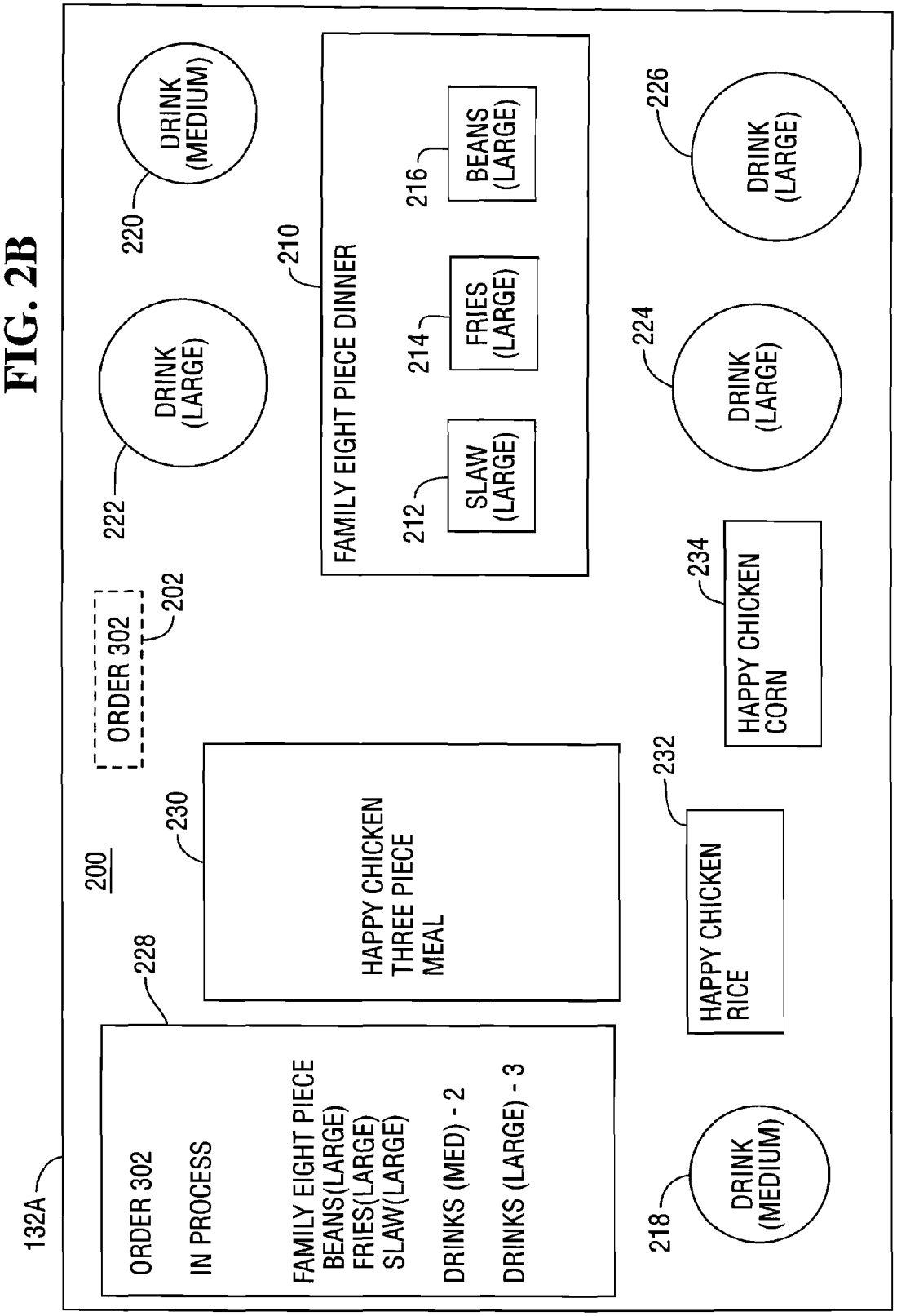

FIG. 2B illustrates the display screen 132A at a further stage of order development. Containers 230, 232, and 234 have been placed on the display screen 132A and been detected by the sensing element 134A. As items are placed on the display screen 132A, the order assembly module 144 receives item information from the sensing element 134A and controls the display screen 132A to present new and updated information. The employee has collected and placed the three piece chicken dinner and the accompanying side dishes, so the containers 230, 232, and 234 are present on the display screen 132A and the icons 204, 206, and 208 have disappeared. In addition, the listings for the three piece chicken dinner and the side dishes have been removed from the order listing 228. The containers 232 and 234 have been placed so as to block the view of the icons 220 and 222, so these icons have been relocated to a visible area.

Figure 2C:
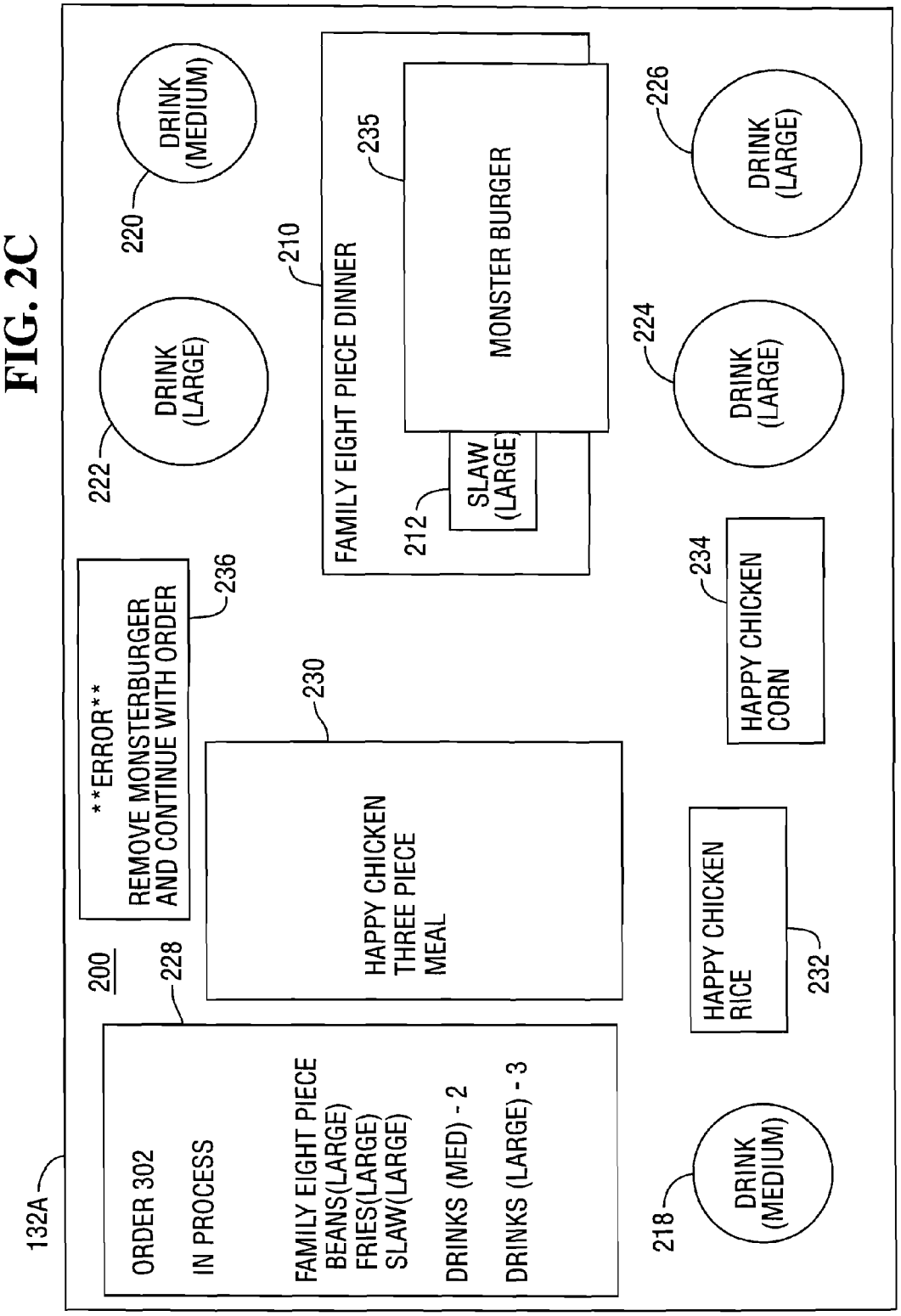

FIG. 2C illustrates the display screen 132A after an incorrect item 235 has been placed there. The incorrect item 234 has been placed over the icon 210, but neither that icon nor any of the other remaining icons has been removed because the incorrect item 234 does not correspond to any of the icons present. Instead, the display screen 132A presents an error message 236 instructing the preparer that an incorrect item is present and identifying the item.

FIG. 2D illustrates the display screen 132A after all items comprising the order have been placed. The items 240-252 are present on the display screen, all of the icons 204-226 have been removed, and a completion message 254 is being displayed. The completion message 254 includes an order identifier 256, and may also include a listing of the items in the order. The printer 136A may also print an order completion record indicating the items, together with the order identifier.

FIG. 3 illustrates display screen 132C, with adjacent assembly area 133 and sensing device 134C. As noted above, the display screen 132C is vertical. Items placed in the assembly area 133 are sensed by the sensing device 134C without being placed directly on the icons presented by the display screen 132C. In the present illustrative example, the sensing device 134C is an omnidirectional infrared sensor, sensing infrared tags affixed to or embedded in item containers.

The display screen 134C is shown here presenting a display showing icons 304-310, indicating a family eight piece chicken dinner with two large sides, and an individual two piece dinner with one small side. The display screen 134C also presents an order listing 314, indicating the items to be delivered. A bag 316 is shown placed on the order assembly area 133. As items 318-326 are placed in the bag 316, the corresponding tags 328-336 affixed to the items are sensed by the device 134C, which is capable of detecting infrared emissions through the bag 316. The order assembly module 144 receives item identification information from the device 134C and controls the display screen 132O to remove icons, indicate erroneously placed items, and indicate completion of an order in ways similar to those described above with respect to the display screen 132A.

Figure 4:
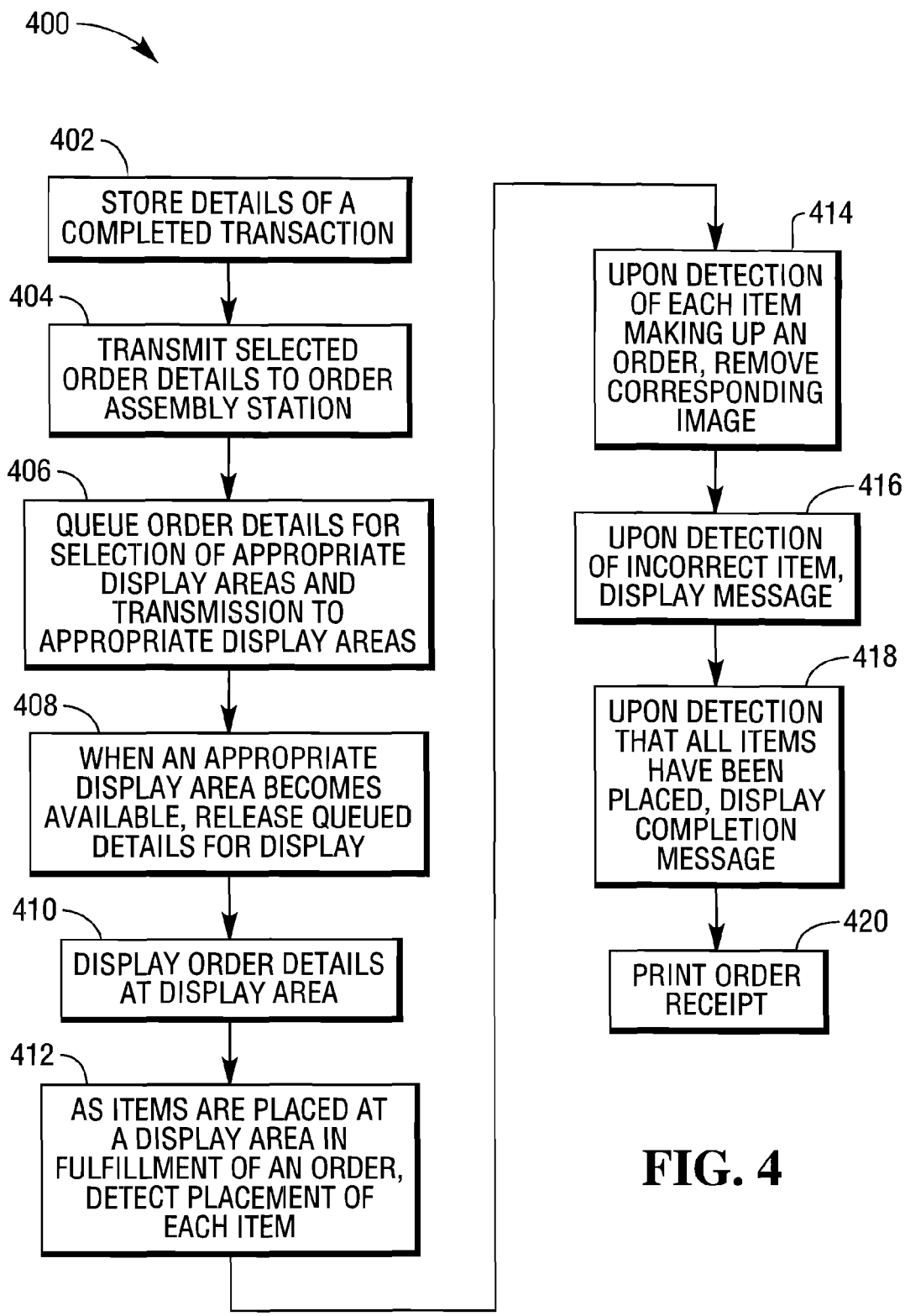
FIG. 4 illustrates a process of fast food order assembly according to an aspect of the present invention.

FIG. 4 illustrates the steps of a process 400 of order management according to an aspect of the present invention. The process 400 may suitably be carried out using a system such as the system 100 of FIG. 1. At step 402, upon completion of an ordering transaction, details of the transaction are stored at a central server. The details may include information such as an order identifier, items making up the order, item prices and transaction total, whether or not the order is a takeout order, whether or not the order is a drive through order, or other relevant information. At step 404, selected transaction details are transmitted to an order assembly station. The transmitted details include those directed toward preparation and delivery of the order, and may suitably include information such as order identifier, identification of items, classification as takeout or not, classification as drive through or not, and other information relevant to assembling the order. Financial details may also be included if desired, for example, for convenience in preparing a receipt. At step 406, order details are queued for display at appropriate display areas, so that when a display area appropriate to an order becomes available, order details will be transmitted to that area for display.

At step 408, as an appropriate order assembly area becomes available, order details are released from the queue for display at the order area. Determination of an appropriate order area includes taking into account the nature of the order and the nature of the different order assembly areas available. For example, drive through orders may be directed to order assembly areas appropriate for drive through orders.

At step 410, details of an order to be prepared are displayed at an order assembly area. The details may include icons or other images representing items to be assembled. For example, rather than icons photographic or other realistic images may be presented. A text listing of order items may be also presented. Displaying of the order details may be performed using an interactive display screen, with touch, image, and object recognition and processing capabilities, or alternatively may be performed using a display screen having only display capabilities. In either case, the display screen may also have an associated sensing device, such as an RFID or infrared reader. The display only screen may also have an associated bar code reader or similar device for reading presented images or codes.

At step 412, as items are placed at the assembly area in fulfillment of an order, each item is detected, for example, by reading an optically encoded image affixed to the item packaging, such as a bar code or graphic tag, or by reading an encoded transmission from a tag affixed to the item's packaging, such as an RFID or infrared tag. At step 414, as each item is detected, the corresponding displayed image is removed. At optional step 416, carried out upon detection of an incorrect item, a notification is presented that the item is incorrect. Steps 414 and 416 are repeated until all items associated with the order have been detected and their corresponding images removed.

At step 418, once all items associated with the order have been assembled and detected, a notice is displayed indicating that the order is complete. The notice may include an order identifier, and may also include a listing of order contents. At step 420, a receipt may be printed, including the order identifier along with desired transaction details.

While the present invention is disclosed in the context of a presently preferred embodiment, it will be recognized that a wide variety of implementations may be employed by persons of ordinary skill in the art consistent with the above discussion and the claims which follow below.

We claim:

1. A system for order fulfillment, comprising:
   storage for storing selected order details, the order details including identification of items comprising the order;
   a processor for preparing a display indicating the items to be assembled for the order, the display including a first image corresponding to a first item from the order and a second image corresponding to a second item from the order;
   a display screen for presenting the display including the first and second images;
   one or more sensing devices for automatically detecting and recognizing items assembled in fulfillment of the order; and
   the processor being operative to remove the first image from the display upon detection by the sensing device of the first item.

2. The system of claim 1, wherein one or more of the sensing devices is incorporated into the display screen.

3. The system of claim 2, wherein the display screen is oriented horizontally and wherein one or more of the sensing devices detects items placed on the display screen.

4. The system of claim 3, wherein the processor rearranges the display to insure that images remaining on the display screen are not obscured by items placed on the display screen.

5. The system of claim 2, wherein one or more of the sensing devices provides one or more of optical code reading capability and remote sensing capability.

6. The system of claim 1, wherein the processor is operative to present an error message upon detection by the sensing device of an incorrect item.

7. The system of claim 1, wherein the one or more sensing devices include weight sensing devices and wherein the processor is operative to present an error message upon detection by one of the one or more sensing devices of an incremental weight not matching an expected weight of an item remaining to be assembled.

8. The system of claim 6, wherein the error message includes identification of the incorrect item.

9. The system of claim 1, wherein the processor is operative to present a completion message when all items comprising the order have been detected.

10. The system of claim 1, further comprising a printer, and wherein the processor is operative to direct printing of an order receipt when all items comprising the order have been detected.

11. The system of claim 1, wherein the display screen is a freestanding display screen and wherein the sensing device remotely senses items placed in an order assembly area adjacent to the display screen.

12. A method of order preparation, comprising the steps of:
storing details of an order transaction in a computer memory accessible to a processor;
controlling the processor to select transaction details relevant to assembly of the order, the relevant details including items comprising the order;
controlling the processor to present a display including a first image corresponding to a first item from the order and a second image corresponding to a second item from the order;
controlling one or more sensing devices to detect items corresponding to the order; and
upon detection of the first item by said one or more of the sensing devices, controlling the processor to remove the first image from the display.

13. The method of claim 12, further comprising controlling the processor to present an error message upon detection of an item not included in the order.

14. The method of claim 12, wherein the step of controlling the sensing device comprises controlling one or more of the sensing devices to read an optical code.

15. The method of claim 12, wherein the step of controlling the one or more sensing devices comprises controlling one or more of the sensing devices to perform remote sensing.

16. The method of claim 12 wherein one or more of the sensing devices is incorporated into a horizontal display screen and the step of controlling the one or more sensing devices comprises controlling one or more of the sensing devices to detect an item placed on the horizontal display screen.

17. The method of claim 12, wherein controlling the one or more sensing devices comprises controlling one or more of the sensing devices to remotely detect an item placed in the vicinity of a vertical display screen.

18. The method of claim 12, wherein controlling the one or more sensing devices comprises controlling one or more of the sensing devices to detect a weight of the items placed an order assembly area and further comprising a step of controlling the processor to present an error message when detected weight increment does not represent an expected weight of an order remaining to be assembled.

19. The method of claim 12, further comprising a step of controlling the processor to present a completion message when all items comprising the order have been detected.

20. The method of claim 12, further comprising a step of controlling the processor to direct printing of a receipt when all items comprising the order have been detected.

21. The system of claim 1 wherein the items comprise fast food menu items.

* * * * *